United States Patent [19]

Bettino et al.

[11] Patent Number: 4,734,991

[45] Date of Patent: Apr. 5, 1988

[54] ADJUSTABLE ROLLER SUPPORT FOR CUTTING TORCHES

[76] Inventors: Louis A. Bettino, 205 West Post Rd., White Plains, N.Y. 10606; George Spector, 233 Broadway, Rm 3615, New York, N.Y. 10007

[21] Appl. No.: 904,915

[22] Filed: Sep. 8, 1986

[51] Int. Cl.⁴ .............................................. B23K 7/10
[52] U.S. Cl. ..................................... 33/32.2; 266/66; 266/67
[58] Field of Search ..................... 33/18.1, 32.2, 42; 266/66, 67, 77, 76, 70, 71

[56] References Cited

U.S. PATENT DOCUMENTS

| | | | |
|---|---|---|---|
| 2,475,891 | 7/1949 | Harris | 266/67 X |
| 2,852,245 | 9/1958 | Lamb | 266/66 X |
| 3,514,087 | 5/1970 | Richards | 266/66 |
| 3,698,701 | 10/1972 | Straub | 266/66 |
| 4,405,117 | 9/1983 | Ohlaug | 266/67 |

Primary Examiner—William D. Martin, Jr.

[57] ABSTRACT

A guide roller attachment for a cutting torch which consists of a clamp member secured to hex nut of the cutting torch and a pair of elongated legs with knurled wheels rotatably coupled thereto. The legs are adjustably coupled to the clamp member to control distance of the torch tip to a workpiece and stabilize the cutting torch during its push/drag along the work piece when straight and bevel cutting.

1 Claim, 1 Drawing Sheet

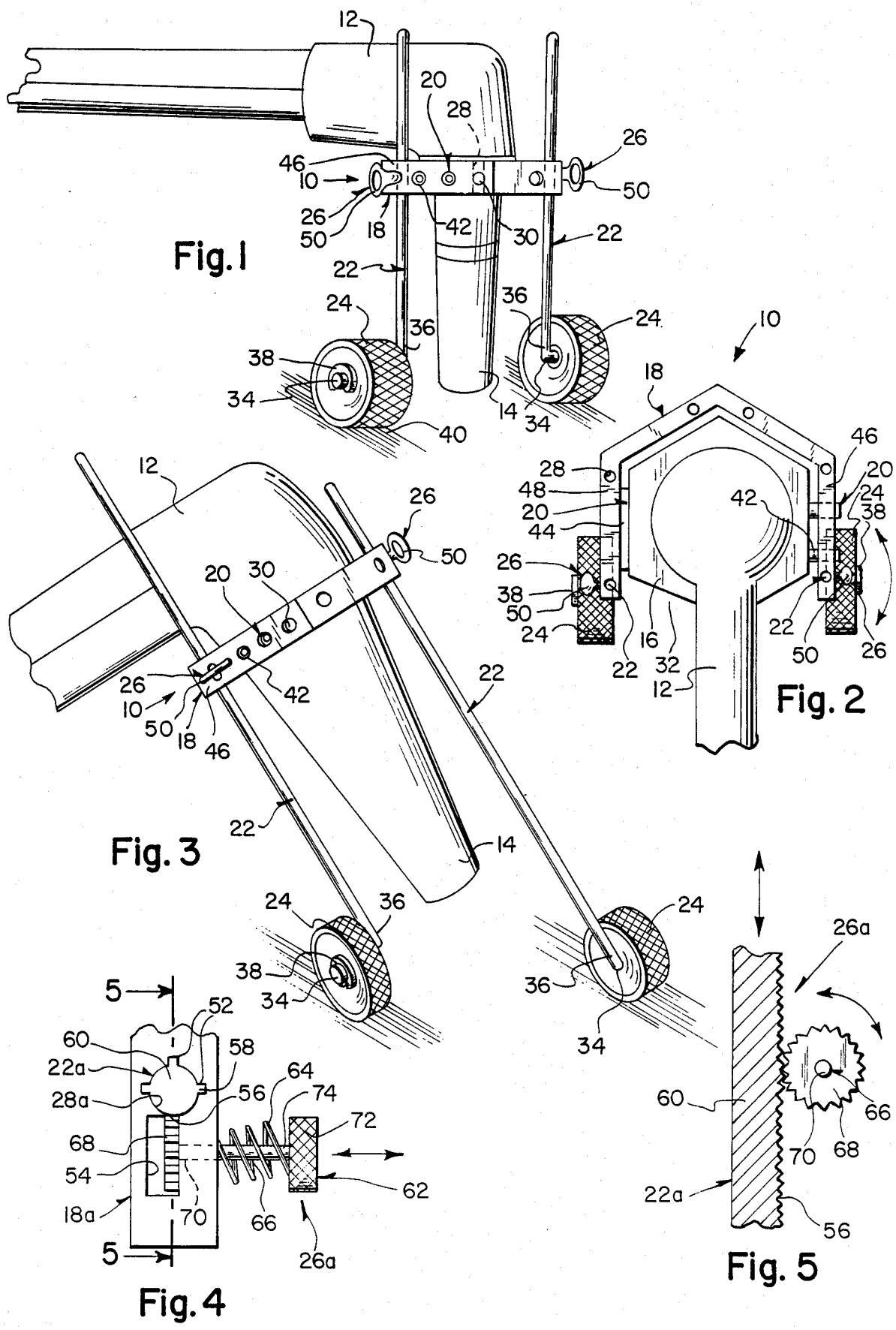

ADJUSTABLE ROLLER SUPPORT FOR CUTTING TORCHES

BACKGROUND OF THE INVENTION

The instant invention relates generally to cutting torch holders and more specifically it relates to a guide roller attachment for a cutting torch.

Numerous cutting torch holders have been provided in prior art that are adapted to stabilize cutting torches during flame cutting operations. For example, U.S. Pat. Nos. 4,333,636; 4,405,117 and 4,469,311 all are illustrative of such prior art. While these units may be suitable for the particular purpose to which they address, they would not be as suitable for the purposes of the present invention as heretofore described.

SUMMARY OF THE INVENTION

A principle object of the present invention is to provide a guide roller attachment for a cutting torch that will overcome the shortcomings of the prior art devices.

Another object is to provide a guide roller attachment for a cutting torch that allows for full and consistent control of the distance of tip flame to work piece with minimum effort to stabilize the cutting torch during its push or drag along the work piece when straight cutting.

An additional object is to provide a guide roller attachment for a cutting torch that allows for full and consistent control of the angle of tip flame to work piece with minimum effort to stabilize the cutting torch during its push or drag along the work piece when bevel cutting.

A further object is to provide a guide roller attachment for a cutting torch that is simple and easy to use.

A still further object is to provide a guide roller attachment for a cutting torch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention mounted to a cutting torch.

FIG. 2 is a top view thereof.

FIG. 3 is a perspective view of the invention mounted to the cutting torch with one wheel leg raised and one wheel leg lowered to tip the cutting torch for beveling, etc.

FIG. 4 is a partial enlarged top view showing a modification whereby the leg can be adjustably raised and lowered by using a rack and pinion system.

FIG. 5 is a cross sectional view taken along line 5—5 in FIG. 4 showing the rack and pinion system in greater detail.

DETAILED DESCRIPTION OF THE PREFERRED EMBODIMENTS

Turning now descriptively to the drawings, in which similar reference characters denote similar elements throughout the several views, FIGS. 1 through 3 illustrates a guide roller attachment 10 for a cutting torch 12 of the type that has a torch tip 14 and a hex nut 16. The guide roller attachment 10 consists of a hex-shaped clamp member 18, a securing device 20, a pair of elongated legs 22, a pair of heat resistant knurled wheels 24 and an adjusting device 26.

The clamp member 18 has a plurality of vertical holes 28 with a corresponding horizontal threaded hole 30 therethrough and an open side 32 into which the hex nut 16 is placed. The securing device 20 is for securing the hex nut 16 to the clamp member 18.

The legs 22 have axial rods 34 formed on lower ends 36 thereof. Each of the legs 22 is adjustably coupled through one of the vertical holes 28 to the clamp member 18. Each of the wheels 24 is rotatably coupled to one of the axial rods 34 by a C-clip 38 or the like. The adjusting device 26 is for adjusting each of the legs 22 to the clamp member 18 through the corresponding horizontal threaded hole 30 at various heights. It controls distance of the torch tip 14 to a work piece 40 and stabilizes the cutting torch 12 during its push/drag along the work piece 40 when doing straight and bevel cutting.

The securing device 20 includes bolts 42 and a shim 44. The bolts 42 are threaded through one portion 46 of the damp member 18 adjacent the open side 32 thereof to contact the hex nut 16. The shim 44 is affixed to opposite portion 48 of the clamp member 18 adjacent the open side 32 thereof to butt against the hex nut 16 for tight fit of the clamp member when the bolts 42 are tightened.

The adjustably locking device 26 includes a pair of set screws 50, each of which can be threaded through the corresponding horizontal threaded hole 30 in the clamp member 18 for holding one of the legs 22 thereto at various heights.

FIGS. 4 and 5 shows a modified adjusting device 26a. Each of the vertical holes 28a in the clamp member 18a has keyways 52 therein and a chamber 54 formed adjacent thereto. Each of the legs 22a has a rack 56 and keys 58 on upper end 60 thereof to prevent rotation of the leg 22a when inserted within any of the vertical holes 28a on the clamp member 18a.

A plurality of adjustment knobs 62 and compression springs 64 are provided. Each knob 62 has a shaft 66 with a pinion gear 68 on one end 70 and a knurled head 72 on other end 74. Each shaft 66 is placed through the clamp member 18a with the pinion gear 68 in the chamber 54 for engagement with the rack 56. Each spring 64 is mounted on one of the shafts 66 between the knurled head 72 and the clamp member 18a. In one instance the knurled head 72 can be turned to raise and lower the leg 22a. In another instance the knurled head 72 can be pushed in to disengage the pinion gear 68 from the rack 56 for removing the legs 22a therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A guide roller attachment for a cutting torch of the type having a torch tip in with an an encompassing hex nut, said guide roller attachment comprising:
   (a) a hex-shaped clamp member having a plurality of vertical holes with a corresponding horizontal threaded hole therethrough and an open side adapted to receive said hex nut therein;
   (b) means adapted to secure said hex nut to said clamp member;
   (c) a pair of elongated legs having axial rods formed on lower ends thereof, each of said legs is adjustably coupled through one of said vertical holes to said clamp member;
   (d) a pair of heat resistant knurled wheels, each of which is rotatably coupled to one of said axial rods;
   (e) means for adjusting each of said legs to said clamp member through said corresponding horizontal threaded hole at various heights to control distance of said torch tip to a work piece and stabilize said cutting torch during its push/drag along said work piece when doing straight and bevel cutting, wherein said securing means includes:
   (f) at least one bolt threaded through one portion of said clamp member adjacent said open side thereof adapted to contact said hex nut;
   (g) a shim affixed to opposite portion of said clamp member adjacent said open side adapted to butt against said hex nut for tight fit of said clamp member when at least one bolt is tightened, wherein said adjusting means includes:
   (h) each of said vertical holes in said clamp member having at least one keyway therein and a chamber formed adjacent thereto;
   (i) each of said legs having a rack and at least one key on upper end thereof to prevent rotation of said leg when inserted within any of said vertical holes in said clamp member;
   (j) a plurality of adjustment knobs, each having a shaft which a pinion gear on one end and a knurled head on other end, each said shaft placed through said clamp member with said pinion gear on said chamber for engagement with said rack; and
   (k) a plurality of compression springs, each mounted on one of said shafts between said knurled head and said clamp member so that in one instance said knurled head can be turned to raise and lower said leg and in another instance said knurled head can be pushed in to disengage said pinion gear from said rack for removing said leg therefrom.

* * * * *